(12) United States Patent
Costa

(10) Patent No.: US 7,662,470 B2
(45) Date of Patent: Feb. 16, 2010

(54) METHOD AND DERIVED PRODUCT, FOR THE PREPARATION OF CHIPS, FLAKES, PASTES, AND SIMILAR ITEMS, CONTAINING PARTICLES, TO BE ADDED TO MOULDING POLYMERS AND PAINTS

(75) Inventor: Lorenzo Costa, Arese (IT)

(73) Assignee: Supercolori S.p.A., Nerviano (IT)

( * ) Notice: Subject to any disclaimer, the term of this patent is extended or adjusted under 35 U.S.C. 154(b) by 0 days.

(21) Appl. No.: 10/924,031

(22) Filed: Aug. 23, 2004

(65) Prior Publication Data

US 2005/0221090 A1  Oct. 6, 2005

(30) Foreign Application Priority Data

Mar. 30, 2004  (IT)  ........................... MI2004A0629

(51) Int. Cl.
*B32B 5/66* (2006.01)
(52) U.S. Cl. .................. 428/323; 428/403; 428/406; 428/407; 427/212; 427/221; 264/109
(58) Field of Classification Search ................ 428/403, 428/406, 407, 323; 427/221, 212; 264/109
See application file for complete search history.

(56) References Cited

U.S. PATENT DOCUMENTS

| 3,953,657 | A | * | 4/1976 | Yamaguchi et al. ......... 428/406 |
| 4,165,406 | A | * | 8/1979 | Tugukuni et al. ........... 428/407 |
| 4,256,805 | A | * | 3/1981 | Tugukuni et al. ........... 428/357 |
| 4,517,246 | A | | 5/1985 | Matsuyama et al. |
| 5,550,011 | A | | 8/1996 | Fant et al. |

FOREIGN PATENT DOCUMENTS

EP  1 323 786 A1  7/2002

OTHER PUBLICATIONS

"Powder." "Def" 1, 2, 3, 4, Cambridge Advanced Learners Dictionary, 2008 "ed" © Cambridge University Press 2008.
Vincent A. Hackley, The Use of Nomenclature in Dispersion Science and Technology, National Institute of Standards and Technology Recommended Practice Guide, Aug. 2001, p. 1-72, Special Publication 960-3, Washington, 2001.

* cited by examiner

Primary Examiner—Leszek Kiliman
(74) Attorney, Agent, or Firm—Notaro & Michalos P.C.

(57) ABSTRACT

This invention concerns an agglomeration of particles to be used as additives for moulding thermoplastic polymers or paints, said agglomeration being in the form of chips, flakes, powder or paste in which a coating with a carrier of said particles is provided that moves in between the particles to keep them essentially separate from one another, said particles being substantially coated all over their surface. The invention also concern a method to obtain the particles coating with a carrier substantially all over the surface of said particles in form apt to be additivate to moulding thermoplastic polymers or paints in order to obtain flatting of moulded pieces with said thermoplastic polymers or painted with said paints said agglomeration being in the form of chips, flakes, powder or paste, characterized by the fact that said particles are mixed with said carrier in powder to obtain a mixture, said mixing occurring at a temperature which is close, but lower then melting point of said carrier, in order to provoke an adhesion of speck of said carrier on the surface of said particles.

15 Claims, 2 Drawing Sheets

METHOD AND DERIVED PRODUCT, FOR THE PREPARATION OF CHIPS, FLAKES, PASTES, AND SIMILAR ITEMS, CONTAINING PARTICLES, TO BE ADDED TO MOULDING POLYMERS AND PAINTS

This invention concerns a method and the product derived from applying this method, for coating particles to be used as additives for thermoplastic resins or thermosetting resins in order to obtain specific surface effects.

As known, adding particles made of various materials to thermoplastic polymers for injection moulding or to paints makes it possible to obtain specific surface effects, of an optical nature, such as metallised, metallescent and dull finishes, or of a tactile nature, such as a certain degree of softness, commonly known as "soft touch", or specific grip.

Typical examples of the use of additives are the addition of metal powders to obtain a certain gloss or metallescent finish. The latter is used mainly in paints for cars to obtain a specific optical effect that makes the colour appear to be different depending on angle of incidence of the light and/or angle of view.

In the case of injection moulded thermoplastic polymers, or obtained through blow-moulding, moulding or calendering, special effects such as flatting, are obtained by means of a chemical reaction between the thermoplastic polymer and a matting agent. This fact first of all means that the flatting agent must be able to react chemically with the thermoplastic polymer, and in addition the process must be carried out in such a way as to create optimum conditions for obtaining this chemical reaction. The fact that the flatting agent must be able to react, means in turn that each thermoplastic polymer requires specific flatting agents, thereby drastically reducing the possibility of one specific flatting agent being adapted for treating a wide range of thermoplastic polymers.

In addition, the fact that the original thermoplastic polymer has undergone chemical reactions during its transformation, means that it is different from the original, with the result that its physical characteristics are changed and the possibility of recycling is compromised to a greater or lesser extent.

It is known that if a thin layer of particles bound by a resin is put over the surface of an item, optical effects are obtained that make it possible to achieve the dullness required. The solution to the problem of flatting moulded thermoplastic polymers therefore lies in injecting into a mould, either by using an extrusion die to form a parison, or by using a calender, the thermoplastic polymer with the particles added to it prepared so as to obtain uniform distribution of the particles themselves.

The procedure for producing moulded thermoplastic polymer parts is subject of a concurring patent application lodged by the same applicant.

According to this procedure, the thermoplastic polymer to be moulded must be added with particles that in turn are coated with another thermoplastic polymer, known as a carrier, since it acts as a vehicle for transporting these particles on the surface of moulded parts, with this carrier having specific characteristics of physical-chemical compatibility with the thermoplastic polymer to be moulded and with the process itself. More specifically, the melting point for the carrier must be some tens of degrees (for example 50° C.) lower than the glass transition temperature of the particles, which in turn must be higher than or equal to the process temperature.

The object of this invention is a method for preparing these particles in such a way as to make them suitable for adding to the thermoplastic polymer to be moulded: in other words, the particles are individually coated with the carrier. Various methods are known for coating individual particles using a thermoplastic polymer.

The U.S. Pat. Nos. 4,165,406 and 4,256,805 (Dai Nippon) patents cover powder compositions for coating, in which polymer particles are to be found with a softening temperature not exceeding 90° C. coated with a polymer with a softening temperature of at least 100° C. This method is not suitable due to the characteristics of the components, as the coating polymer does not have a melting point that is at least a few tens of degrees (for example 50° C.) lower than the glass transition temperature for the particles.

The WO 00/63332 (Procter & Gamble) patent provides for using polymers dissolved in water, while U.S. Pat. No. 3,953,657 (Mitsui) provides for using an aqueous or alcohol means with polymerisation initiators, to form a polymer on the surface of the particles. These two methods are not suitable since the thermoplastic polymer to be moulded must have materials added to it that are completely free of water or other liquids.

The U.S. Pat. Nos. 5,494,709 and 5,721,012 (Coating Machinery System) patents provide for spraying a coating product in solution onto the particles while these are mixed in a drum. These two methods are not suitable because they leave solvent residues.

The KR 9701214 patent describes coating particles by spraying other particles that are electrically charged, in order to form electrostatic bonds. This method does not allow the particles to be coated completely.

On the other hand purely and simply adding particles as such has lead to disappointing aesthetic results, as the particles only partly migrate over the surface of the parts, in addition they form lumps that give rise to spots on the surface of moulded parts. This phenomenon is due first of all to the fact that there is no carrier capable of favouring migration. In addition, the particles tend to stick together in such a way that they cannot be separated through subsequent mixing in the extruder.

This invention is intended to resolve the above mentioned difficulties, proposing a method, and the product deriving from it, for creating granules that contain particles that are individually coated by a carrier, especially polyurethane microspheres, these granules being suitable to be used as additives for thermoplastic polymers for injection moulding. In this way the injection moulded part has a uniform surface both visually, and to the touch.

The product obtained fulfils claim 1, while the method used fulfils claim 15. This product takes the form of an agglomeration of particles in the form of chips, flakes, powder or paste, in which the particles are coated with the carrier, which moves in between the particles in order to keep them essentially separate from one another. This method consists of a procedure that is used to obtain coating of each particle with the carrier, so that most of the surface of each of the particles is coated. These chips, flakes, powder, or paste can easily be added to the polymer to be moulded. When adding to powder coatings it is obviously better to use the agglomerate as per the invention in powder form.

While the extruder is being heated, the carrier, by which the particles are coated, is plasticised allowing them to be deposited on the surface of the thermoplastic polymer granules to be moulded. This takes place because the coating polymer, despite acting as a bonding agent between the particles to make them easy to use, prevents these from sticking together and, when it is melted in the extruder, first favours the distribution of the particles on the granules of the thermoplastic polymer to be moulded and then the migration of the particles towards the surface of the moulded parts.

The carrier with which the particles are to be coated must obviously be compatible with the thermoplastic polymer to be moulded and form a blend or an alloy with them.

This invention will now be described in detail with reference to the figures enclosed in which.

The procedure involved in this invention provides for physically mixing the particles with the polymer that is to coat them, which in turn is in fine powder form with a maximum grain size of 200 microns.

The first operation to be carried out involves drying the particles and the coating polymer, which is done in two stages in a high-speed mixer (2000-3000 rpm), working at a temperature of 30-60° C.

In the first stage a vacuum must be created inside the mixer, while in the second stage nitrogen or some other inert gas can be injected in order to allow, thanks to reduction of the steam partial pressure inside the mixer, the elimination of the residual amount of humidity. This drying treatment can last from about ten minutes to two hours, depending on the treatment temperature. On completion of this treatment, however, the residual humidity must not be higher than 0.1%. Particle and polymer treatment should preferably be carried out separately.

Once the dehumidifying treatment has been completed, you move on to the mixing operation. This operation is carried out with a high-speed mixer (2000-3000 rpm) and at a temperature below the glass transition temperature of the material making up the particles, and this temperature must be below but near the melting point of the carrier. This means that the glass transition temperature of the material making up the particles must be higher than the melting point of the carrier.

Since the process temperature is lower than the glass transition temperature of the material making up the particles, these, due to the effect of powerful mixing, tend to be separate from one another, thereby breaking up lumps that, inevitably, have formed, while the carrier, being at a temperature near its melting point, tends to spread around the particles themselves and sticks to them.

Due to the mixing speed, the mixture tends to heat up spontaneously, however, in order to reach the ideal temperature heat must still be supplied, by means of diathermic oil for example.

Figure 1:
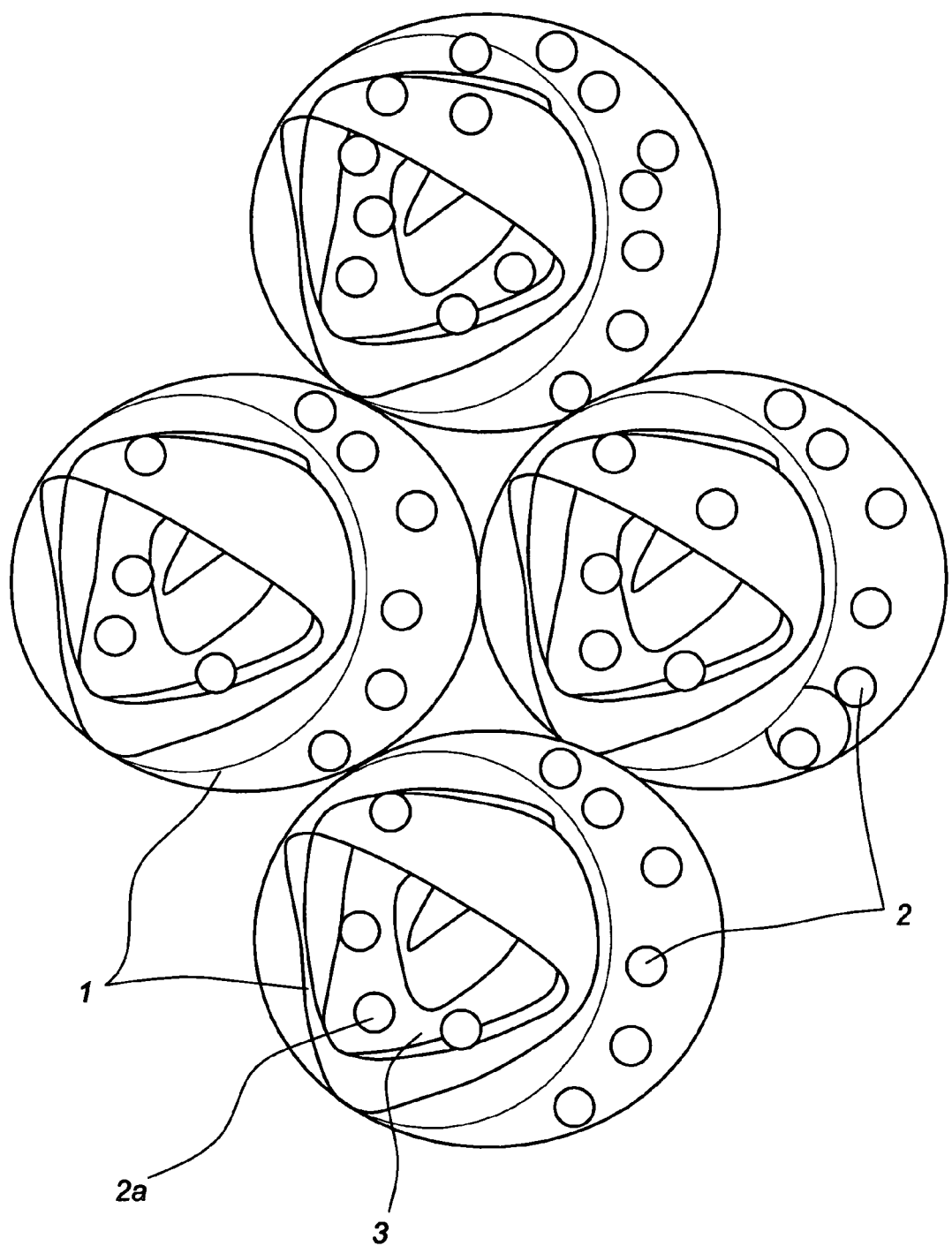
FIG. 1 shows some particles with fragments of carrier sticking to the surface.

In this stage the situation illustrated in FIG. 1 occurs, which shows a particle (1) with the carrier particles (2) sticking to its surface. For the sake of simplicity, the drawing only shows a small quantity of carrier particles, whereas in practice the particle (1) is almost completely coated. In addition, a polyurethane type particle is shown, more specifically a macromolecular coil, whose peculiarity is that it is folded back on itself to form a hollow microsphere. In this case the carrier is able to partially penetrate inside the molecule itself, as shown in FIG. 1, in which some carrier particles (2a) are shown in the cavity (3) in the microsphere (1).

Figure 2:
FIG. 2 shows an agglomeration of particles coated with the carrier.

The mixture is then cooled to room temperature thereby obtaining a dry mixture. Under these conditions the polymer adheres to the particles partly because it forms Van der Waals bonds with them, and partly due to mechanical grip, since at least in part the polymer particles, adhering to one another, surround the particles to be coated. This therefore produces the situation shown in FIG. 2, in which, also to keep the drawing simple, the carrier particles are still shown in a smaller quantity than the actual amount.

The dry mixture obtained in this way can be put into an extruder where it is heated to a temperature that exceeds the melting point of the coating polymer, but below the melting point for the material making up the particles to be coated. For example, when using a carrier with a melting point of 70-80° C. a temperature of 50° C. can be used in the first extrusion stage, it can still be 50° C. for the second stage, in the third stage it can be raised to 80° C. and, in the fourth stage, when the chip comes out, the temperature can reach 85° C. Thus, compaction takes place at a temperature at which the carrier is softened, and the melting point is only reached in the final stage.

Under these conditions the coating polymer melts and is absorbed by the particles thereby coating almost 100% of their surface.

In this way compact solid granules or flakes are obtained that can easily be added to thermoplastic polymers to be moulded, and these granules and flakes can in turn be ground in order to obtain powders that are suitable for mixing with paints.

The procedure described that results in the creation of granules or flakes is particularly suited where the carrier has a melting point of at least 60-70° C. However, especially in the case of additives for PVC and for calendering moulding techniques, a carrier can be used in a liquid state at room temperature. In this case the carrier should preferably be a dioctyl phthalate plasticiser commonly used as a PVC additive. In this case, by adding a product made according to this invention to PVC, plasticisation and flatting can be obtained simultaneously.

Obviously in this case the entire procedure described must be carried out at a temperature at which the carrier is solid, and so the entire plant must be suitably cooled. Only after, the dry mixture, having been brought back to room temperature, will take on the form of a paste of varying viscosity that can be used as it is.

The procedure described can also be carried out using particles other than polyurethane, that is of an organic type such as acrylic, cellulose, polyamide, urea, but also of an inorganic type, such as silica, mixed potassium and aluminium silicates, talcs, etc.

The carrier in its turn must be chosen in relation to the nature of both the particles to be coated, and the thermoplastic polymer to be moulded or the resin making up the paint, to which it is to be added. According to one method of applying the invention, the carrier can be made up of a mixture of compounds, provided that these are compatible with the thermoplastic polymer or resin making up the paint to which the carrier must be added. By way of example but not limited to this method, the carrier can be made up of an organic compound chosen from: polyethylene, polyethylene modified with 11% ethylene vinyl acetate, polyethylene modified with 21% ethylene vinyl acetate, terpene phenolic resin, dioctyl phthalate, diisobutyl phthalate, diisonyl phthalate, diethyl adipate, dioctyl adipate, ethyl citrate, octyl palmitate, myristyl palmitate, cetyl stearyl palmitate, ethyl hexyl palmitate, purified castor oils, hydrogenated castor oils, olein, stearine, triglycerides, and these carriers may be made up of only one of these organic compounds or a mixture of the same. By way of example but not limited to this case, tab. 1 shows some compositions, while tab. 2 shows the melting points and viscosity of the components used.

TABLE 1

Examples of compositions

| Formula | CARRIER 1 Name | % | CARRIER 2 Name | % | CARRIER 3 Name | % | Particles Name | % |
|---|---|---|---|---|---|---|---|---|
| 1 | Low density Polyethylhene omopolymer | 22.8 | Terpene Phenolic Resin | 7.2 | — | — | Decosphaera TR 5 F | 70 |
| 2 | Low density Polyethylhene omopolymer | 22.8 | Terpene Phenolic Resin | 7.2 | — | — | Decosphaera TR 7 F | 70 |
| 3 | Low density Polyethylhene omopolymer | 22.8 | Terpene Phenolic Resin | 7.2 | — | — | Decosphaera TR 7 F ES | 70 |
| 4 | Polyethylhene | 50 | — | — | — | — | Decosphaera TR 7 F ES | 50 |
| 5 | Modifyed Polyethylhene with EVA (11%) | 50 | — | — | — | — | Decosphaera TR 7 F ES | 50 |
| 6 | Modifyed Polyethylhene with EVA (21%) | 50 | — | — | — | — | Decosphaera TR 7 F ES | 50 |
| 7 | Hydrogenated Castor Oil | 50 | — | — | — | — | Decosphaera TR 7 F ES | 50 |
| 8 | Cetyl Palmitate | 50 | — | — | — | — | Decosphaera TR 7 F ES | 50 |
| 9 | Cetyl Palmitate | 20 | Ethyl Hexyl Palmitate | 20 | Polyethylhene | 10 | Decosphaera TR 7 F ES | 50 |
| 10 | Ethyl Hexyl Palmitate | 20 | Cetyl Palmitate | 30 | — | — | Decosphaera TR 7 F ES | 50 |

TABLE 2

Melting point and viscosity of components

| Name | Melting point [° C.] | Viscosity [cps] |
|---|---|---|
| Polyethylhene | 100-110 | 200 a 140° C. |
| Terpene Phenolic Resin | 129-140 | 500-1500 |
| Modifyed Polyethylhene with EVA (11%) | 95 100 | 600 a 140° C. |
| Modifyed Polyethylhene with EVA (21%) | 65-70 | 200 a 140° C. |
| Hydrogenated Castor Oil | 105-125 | 150 |
| Cetyl Palmitate | 85-90 | 15 |
| Ethyl Hexyl Palmitate | −5 | 10 |

The invention claimed is:

1. Method to obtain coating of particles with a carrier, substantially covering the entire surface of said particles to form an agglomerate, the agglomerate being an additive for moulding thermoplastic polymers or paints, where the agglomerate is one of chips, flakes, powder or paste, the method comprising providing said particles to be organic and the carrier to have grains, the method further comprising mixing the particles with the carrier in powder form to obtain a mixture, said mixing taking place at a temperature near but lower than the melting point of said carrier, in order to cause the grains of the carrier to stick to the surface of the particles by forming physical bonds, said particles to be organic being made of polyurethane, or of a cellulose, polyamide, acrylic or urea organic type, said particles to be organic being coated prior to agglomeration, said physical bonds being van der Waals bonds.

2. Agglomeration of organic particles to be used as additives for moulding thermoplastic polymers or paints and made according to claim 1, said agglomeration being in the form of one of chips, flakes, powder or paste, said organic particles being coated with the grains of the carrier that adhere to the particles forming physical bonds with the particles, so that the carrier grains are between the particles to keep the particles separate from one another, and with the surface of the particles being substantially coated with the carrier, said organic particles being made of polyurethane, or of a cellulose, polyamide, acrylic or urea organic type, said organic particles being coated prior to agglomeration, said physical bonds being van der Waals bonds.

3. Agglomeration according to claim 2, wherein said particles to be coated are made of material that withstands the melting temperature of the carrier that covers the particles.

4. Agglomeration according to claim 2, wherein said carrier has a melting point that is lower than the melting point of the particles that are to be coated.

5. Agglomeration according to claim 2, wherein said carrier has a melting point that is lower than a glass transition temperature of the particles that are to be coated.

6. Agglomeration according to claim 2, wherein said carrier is chemically compatible with the thermoplastic polymers to be moulded.

7. Agglomeration according to claim 2, wherein said carrier is chemically compatible with said paints.

8. Agglomeration according to claim 2, wherein said particles to be coated are made of material that withstands the temperature at which extrusion of said moulding thermoplastic polymer to which said agglomeration is to be added takes place.

9. Agglomeration according to claim 2, wherein said particles to be coated are made of material that withstands the temperature at which the paint to which said agglomeration is to be added is polymerised.

10. Agglomeration according to claim 2, wherein the particles to be coated have a glass transition temperature that is not lower than the temperature at which said moulding thermoplastic polymer to which said agglomeration is to be added is extruded.

11. Agglomeration according to claim 2, wherein said carrier is an organic compound chosen from: polyethylene, polyethylene modified with 11% ethylene vinyl acetate, polyethylene modified with 21% ethylene vinyl acetate, terpene phenolic resin, dioctyl phthalate, diisobutyl phthalate, diisonyl phthalate, diethyl adipate, dioctyl adipate, ethyl citrate, octyl palmitate, myristyl palmitate, cetyl stearyl palmitate, ethyl hexyl palmitate, purified castor oils, hydrogenated castor oils, olein, stearine, triglycerides, and mixtures thereof.

12. Method according to claim 1, wherein said coated particles are treated by an extruder to obtain grains or flakes.

13. Method according to claim 1, including using a liquid carrier at room temperature thereby allowing agglomeration of said coated particles in the form of a paste.

14. Method according to claim 1, including an additional stage during which said mixture is dried.

15. Method according to claim 14, wherein said mixture drying stage takes place in a vacuum or a nitrogen or inert gas atmosphere.

* * * * *